March 6, 1951  C. T. OLSON  2,544,469

PRECISION ANGLE AND INTERNAL TAPER GAUGE

Filed March 20, 1947  2 Sheets-Sheet 1

Inventor
Carl T. Olson

By *Clarence A. O'Brien and Harvey B. Jacobson*
Attorneys

March 6, 1951  C. T. OLSON  2,544,469
PRECISION ANGLE AND INTERNAL TAPER GAUGE
Filed March 20, 1947  2 Sheets-Sheet 2

Inventor
Carl T. Olson

By Clarence A. O'Brien
and Harvey B. Jacobson
Attorneys

Patented Mar. 6, 1951

2,544,469

UNITED STATES PATENT OFFICE 2,544,469

PRECISION ANGLE AND INTERNAL TAPER GAUGE

Carl T. Olson, Belle Vernon, Pa., assignor of fifty per cent to Hugo W. Nahi, Monessen, Pa.

Application March 20, 1947, Serial No. 735,867

3 Claims. (Cl. 33—174)

The present invention relates generally to precision tools for the use of machinists, and more particularly to a metering gage for measuring internal tapers, that is, the taper of a bore or hole, while the tool is held against the end of the work being measured, the tool being also adapted for measuring external angles.

An object of this invention is to provide a tool which will facilitate the measurement of the taper in a bore, the tool being adapted for the insertion thereinto of anvils of different lengths, so that both obtuse and acute angles may be measured, and the taper of a bore can be measured from either end of said bore, it being understood that this tool is primarily adapted for measuring angles and tapers where a flat face is provided on the work, the flat face of the body portion of the tool being placed on the flat face of the work while the measurement is being made.

Another object of this invention is to provide a metering tool of this character which will provide direct measurements of the two dimensions giving the tangent of the angle in the taper; with the tangent known, the machinist may work directly from these values or he may obtain the value of the angle by reference to tables of trigonomical functions.

Another object of this invention is to provide a device of this character for use in measuring exterior angles, the two anvils being placed on one side of the object to be measured and the flat face of the body portion of the tool being placed on another side, the angular disposition of these two sides being calculated in a manner very similar to that described above.

Another object of this invention is to provide a tool of this character which, by reason of its structural design, is very rigid and dependable in use.

Still another object of this invention is to provide a tool which can be adjusted in a very simple manner, to obtain a precise zero setting of the tool prior to making a measurement therewith.

And a last object to be specifically mentioned is to provide a tool of this character which is relatively inexpensive and practicable to manufacture, simple and convenient to use, easily understood and which will give generally efficient and durable service.

With these and other objects definitely in view, this invention resides in certain novel features of construction, combination and arrangement of parts and portions as will be hereinafter described in detail and particularly set forth in the appended claims, reference being had to the accompanying drawings which form a material part of this application, and in which:

Similar characters of reference designate similar or identical parts and portions throughout the specification and throughout the several views of the drawings.

Figure 1:
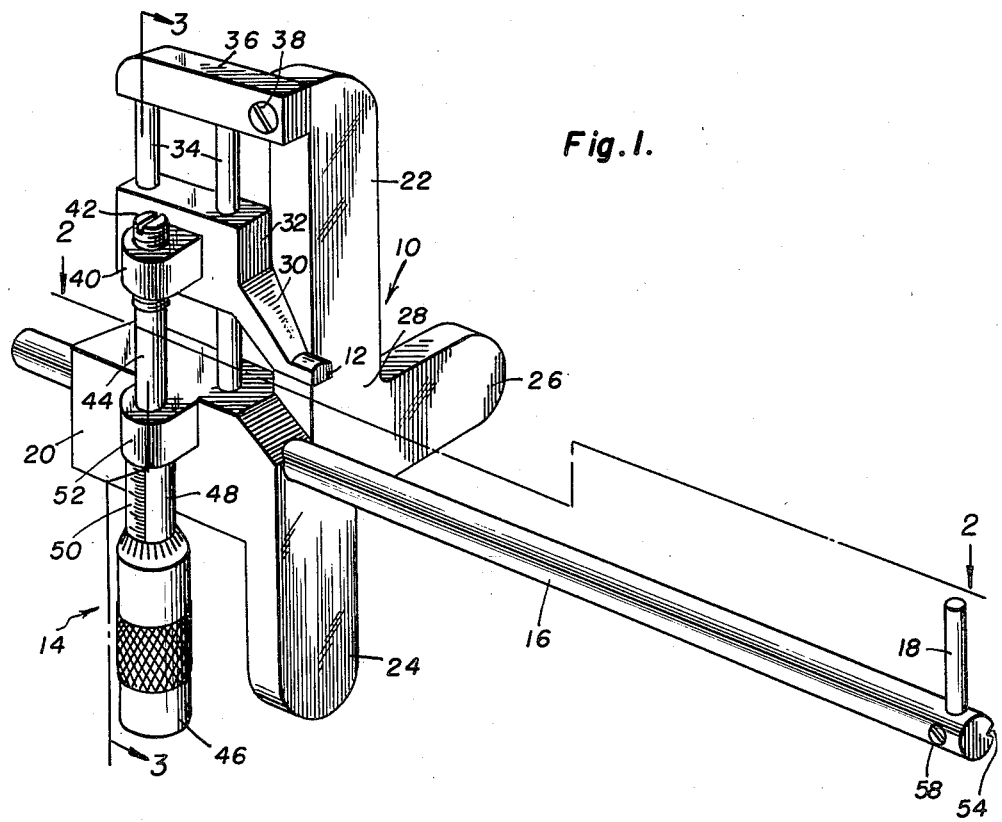
Figure 1 is a perspective view of the assembled tool.
Figure 2:
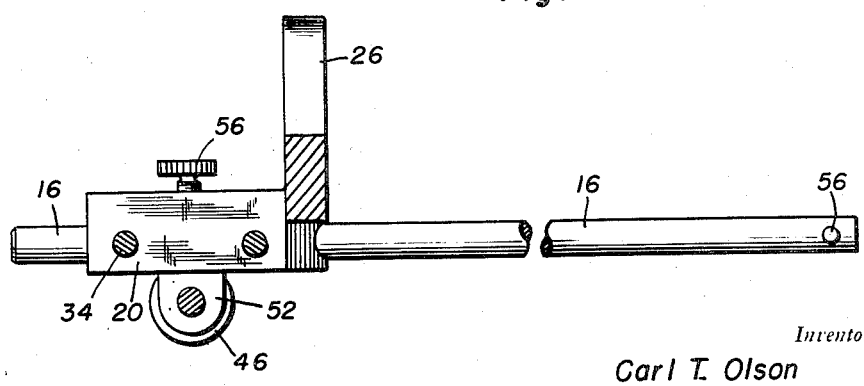
Figure 2 is a horizontal sectional view, taken on the line 2—2 in Figure 1.

Referring now to the drawings in detail, it will be noted that this tool includes a body portion, generally represented by the numeral 10, an adjustably mounted anvil 12, a micrometer gage generally represented by the numeral 14 and adapted to provide for metered adjustment of the anvil 12, a distance bar 16 slidably mounted in the body portion 10 and a distance bar anvil 18.

The body portion 10 is of unitary character comprising a generally rectangular block 20, vertically disposed portions 22 and 24 and a right angularly disposed portion 26, the portions 22, 24 and 26 having a common flat face which will be hereinafter referred to as the face 28 of the body member. The anvil 12 comprises the terminal member of a downwardly inclined finger 30 which is integral with the traveller block 32, this traveller block being generally rectangular in shape and the said finger being preferably tapered as illustrated. A pair of vertically disposed parallel traveller guide bars 34 are terminally secured in the upper face of the rectangular portion 20 and in the lower face of the transversely disposed bar 36, which is secured by any suitable means, as illustrated at 38, to the upper end of the body portion 22, it being understood that the traveller block 32 is provided with spaced and carefully machined bores to receive the parallel guide bars 34. The traveller block 32 is provided with a boss member 40 which is drilled and tapped to receive the adjustment screw 42, the lower end of which is adapted to abut the upper end of the spindle 44, which spindle is secured to the thimble 46, according to the substantially standardized practice in the construction of micrometer gages. A sleeve 48, calibrated as at 50, is threadedly associated with the thimble 46 and is rigidly secured to a boss 52 on the outer face of the portion 20, this boss 52 being drilled to receive the spindle 44. Obviously, the boss 40 and the boss 52 must be arranged so that the upper end of the spindle 44 will contact the lower end of the adjustment screw 42.

The distance bar 16 may be cylindrical or otherwise shaped and is slidably associated in a bore provided therefor disposed longitudinally through the rectangular portion 20, this bore for the distance bar 16 being disposed at right angles to the face 28. If the distance bar 16 is cylindrical, a groove 54 on one side thereof is provided to co-act with the point of a set-screw 56 which is used to lock the distance bar at any predetermined position relative to the body 10. At the outer end of the distance bar, the anvil 18 is secured thereto by a set-screw 58, and it should be noted that this anvil is replaceable, being one of a set of anvils of similar character but of different lengths, the drawings showing two such anvils which are used interchangeably, as hereinafter described.

Figure 3:
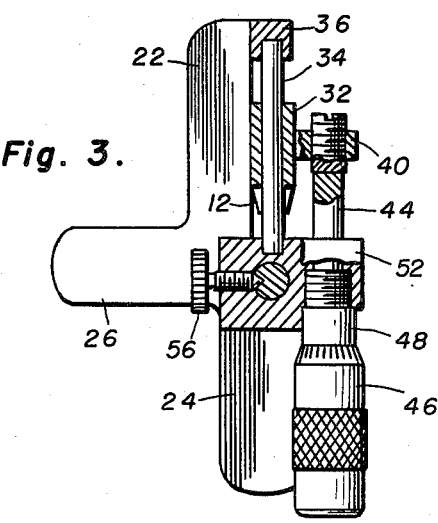
Figure 3 is a transverse vertical sectional view, taken on the irregular section line 3—3 in Figure 1.
Figure 4:
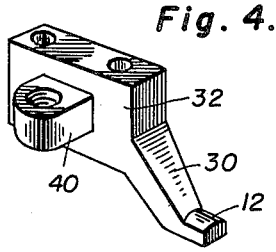
Figure 4 is a perspective view of the traveller and the anvil secured thereon.

It will be understood that many useful modifications may be made in the exact form of the different elements of this invention, for example, the body 10 may be considerably varied in shape, the traveller 32 could be mounted otherwise than on the guide bars 34 and a dial indicator might be substituted for the micrometer gage 14, all without departing from the spirit and scope of this invention. A similar change might be made in the method of attaching the micrometer sleeve 48 to the boss 52, the method illustrated in Figure 3 wherein a portion of this sleeve is exteriorly threaded to facilitate such attachment representing only one of many simple ways of mounting the micrometer gage on the device.

Figure 5:
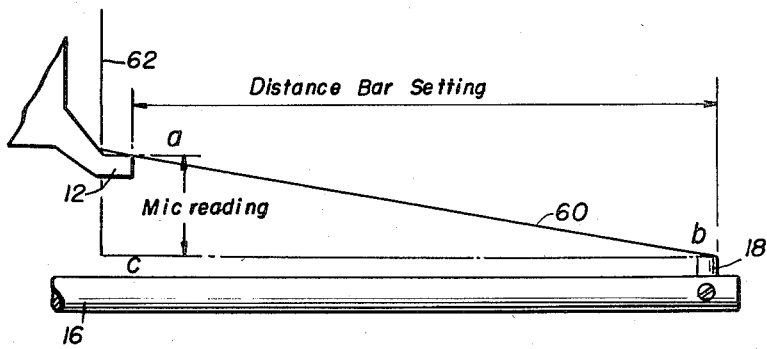
Figures 5 and 6 are diagrammatic views, adapted to illustrate how this tool is used to measure the tapers of bores which have increased and decreased diameters toward the face whereon the tool is placed, respectively, the figures also illustrating how an obtuse angle and an acute angle on the exterior of an object may be measured.
Figure 6:
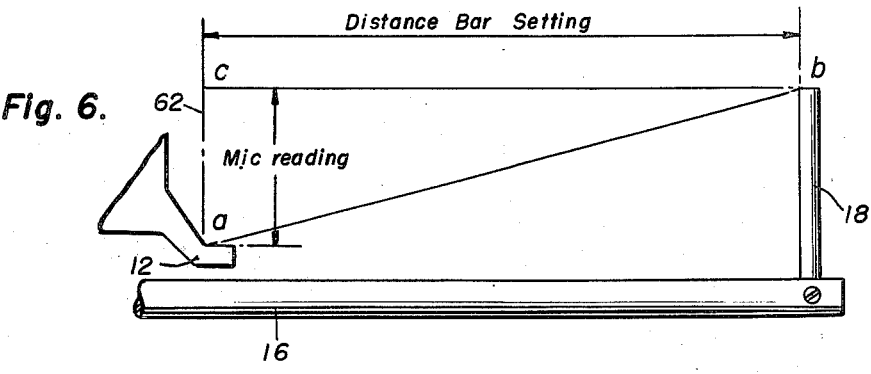

The operation of this invention will be reasonably clearly understood from a consideration of the foregoing description of the mechanical details thereof, taken in connection with the drawings and the above recitation of the objects sought to be achieved by this invention, but if reference is had to Figure 5 and 6, examples of the use of this tool may be more clearly understood. In Figure 5, the line 60 may be thought of as representing the tapered surface of an object with the tapered bore therein and the line 62 represents the flat face of this object. When the face 28 of the tool is made to rest upon the face 62 of the work, while the anvil 18 is made to abut the surface 60 with a proper degree of pressure or "feel," the anvil 12 is moved by turning the thimble 46 until this anvil contacts the surface 60. The distance bar 16 has been set so that the length illustrated in the drawing as the "distance bar setting" is a reasonable dimension and adapted for easy calculation, and the micrometer reading is taken to give the vertical distance from the top of the anvil 18 to the outside of the anvil 12, these two dimensions will give the tangent of the angle $a$—$b$—$c$ directly. If the angle need be known in degrees it can be determined by reference to tables of trigonometrical functions. Figure 6 represents how the angle of a taper, such as in a tapered bore where the diameter of the bore is less at the face 62 than is the diameter farther within the bore, in this case, the longer anvil 18 being secured to the distance bar 16, and the readings taken substantially as before. It should be noted, however, that the distance bar setting must now be considered as the length of the line from the inside edge of the anvil 18 and the curved upper inner edge of the anvil 12. If preferred, a plurality of scales may be added to the distance bar 16, the indicia of these scales not being illustrated in the drawings, since the operation of this tool is not dependent thereon and measurement of the "distance bar setting" can easily be obtained by a scale, that is, by a simple graduated scale of the type which machinists use regularly.

Figure 5 also represents how this tool may be used to measure the exterior angle between faces of a body which, for purposes of this explanation, may be considered the lines 60 and 62. In this case, the face 10 of the tool is made to rest upon the face 60 and the anvil 18 is made to abut the face 62.

The reading of the micrometer, that is, the length 18, divided by the distance bar setting $b$—$c$ will give the tangent of the angle $a$—$b$—$c$, or this same calculation will give the co-tangent of the angle $b$—$a$—$c$ which is the obtuse angle on the outside of the object being measured, co-tangent tables then being used as the simplest method of obtaining the angle at the edge of the object. Similarly, when the angle to be measured is acute, the longer handle 18 may be used, as illustrated in Figure 6, the method of calculation of the angle being exactly similar to the method already described.

It is thought that the foregoing description of the mechanical details of this invention and the method of operation thereof will enable anyone to understand, make and use this invention, and further description is, therefore, deemed unnecessary.

Though there has been shown a particular embodiment of this invention, this application is not limited to this particular embodiment, but it is desired to include in the scope of this invention the construction, combination and arrangement of parts and portions substantially as set forth in the appended claims.

What is claimed as new and desired to be secured by Letters Patent of the United States is:

1. A precision tool comprising a body member having a flat face, an anvil projecting beyond said face and slidably mounted on said body member for movement along said face, a gage mounted on said body member and operatively connected with said anvil for metering said movement, a distance bar extending normal to said face and slidably mounted on said body member for metered adjustment in a direction normal to said face, and an anvil on the outer end of that part of said distance bar extending from said face, said first mentioned anvil being on a traveller, and said traveller being slidably associated with parallel traveller guide bars secured on said body portion.

2. A precision tool comprising a body member having a flat face, an anvil projecting beyond said face and slidably mounted on said body member for movement along said face, a gage mounted on said body member and operatively connected with said anvil for metering said movement, a distance bar extending normal to said face and slidably mounted on said body member for metered adjustment in a direction normal to said face, and an anvil on the outer end of that part of said distance bar extending from said face, said second mentioned anvil being a rod removably mounted on said distance bar and right-angularly disposed thereto.

3. A precision tool comprising a body member having a flat face, an anvil projecting beyond said face and slidably mounted on said body member for movement along said face, a gage mounted on said body member and operatively connected with said anvil for metering said movement, a distance bar extending normal to said face and slidably mounted on said body member for metered adjustment in a direction normal to said face, and an anvil on the outer end of that part of said distance bar extending from said face, said first mentioned anvil being on a traveller, and said traveller being slidably associated with parallel traveller guide bars secured on said body portion, said traveller having an adjustment screw for adjusting said traveller and first mentioned anvil with reference to said gage.

CARL T. OLSON.

REFERENCES CITED

The following references are of record in the file of this patent:

UNITED STATES PATENTS

| Number | Name | Date |
|---|---|---|
| 412,984 | Schmidt | Oct. 15, 1889 |
| 1,039,901 | Constantinescu | Oct. 1, 1912 |
| 1,509,703 | Bourgeois | Sept. 23, 1924 |

FOREIGN PATENTS

| Number | Country | Date |
|---|---|---|
| 390,541 | Germany | Feb. 26, 1924 |
| 238,706 | Switzerland | Nov. 16, 1945 |

OTHER REFERENCES

American Machinist, page 573, Apr. 9, 1931.